Figure 1:
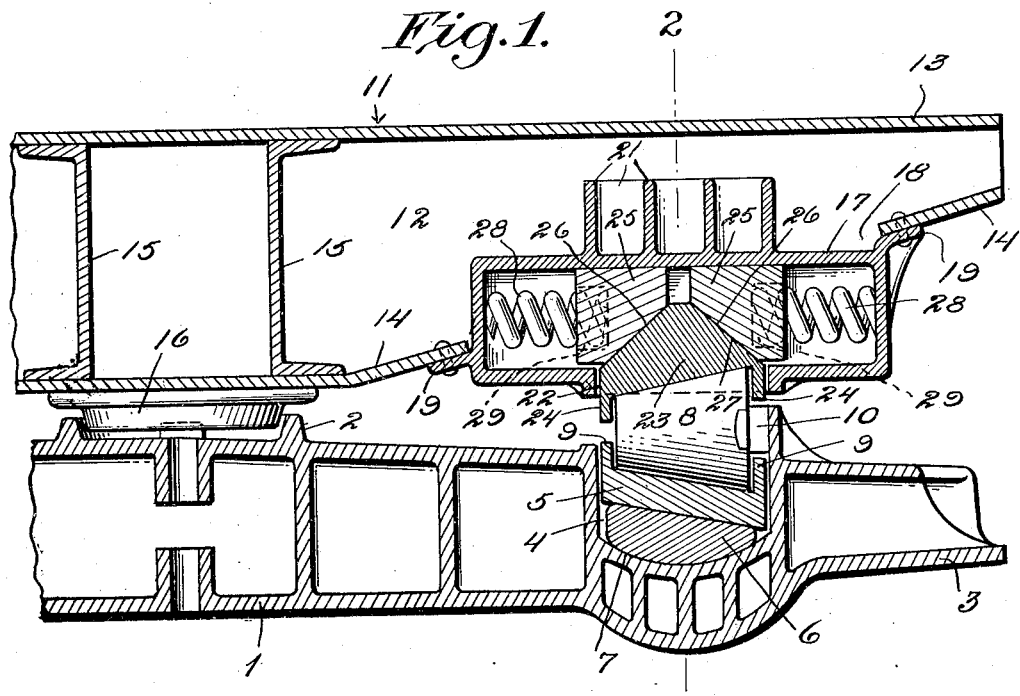

Jan. 6, 1931.  T. H. SYMINGTON  1,788,130
BOLSTER
Filed June 17, 1926

INVENTOR
Thomas H. Symington
BY Ernst ?????
his ATTORNEY

Patented Jan. 6, 1931

1,788,130

UNITED STATES PATENT OFFICE

THOMAS H. SYMINGTON, OF BALTIMORE, MARYLAND, ASSIGNOR, BY MESNE ASSIGNMENTS, TO T. H. SYMINGTON AND SON, INC., OF BALTIMORE, MARYLAND, A CORPORATION OF MARYLAND

BOLSTER

Application filed June 17, 1926. Serial No. 116,663.

The invention relates to car body bolsters.

The principal object of the invention, generally stated, is to provide a body bolster provided with absorption mechanism cooperating with the side bearings, of a truck bolster.

An important object of the invention is the provision of an absorption mechanism or cushioning structure mounted within or carried upon a body bolster and designed particularly for cooperation with the side bearings of a truck of that type in which the load is sustained upon the side bearings with clearance at the center bearing, the invention being, however, likewise capable of application to trucks of that type in which the load is normally sustained upon the center bearing with the side bearings coming into play only under more or less unusual conditions, as for instance when relative rocking movement of the truck and body bolsters occurs, only slight variations in one element of the absorption mechanism being necessary to adapt it for use in connection with either type.

A further object of the invention is to provide a cushioning or absorption mechanism embodying resilient means and friction producing means for opposing relative rocking movement of the truck and body bolsters, the resilient means acting in series with the usual spring supporting means for the truck bolster for changing the latter's period of oscillation, thereby reducing, if not preventing, a development of car roll or side sway.

Another object of the invention is to provide a mechanism of this character which may be used in conjunction with body and truck bolsters of the ordinary types, it being easily possible to attach or mount the device upon a standard body bolster without making any material alterations therein, though of course a body bolster may be specially built with the absorption or cushioning means therein.

Another object is to provide additional vertical resilient displacement of the car body for the purpose of having additional spring deflection under both the light and loaded cars, this additional travel intended to provide an additional means for keeping the wheel in contact with low spots in the track.

Still another object of the invention is to provide a cushioning or absorption mechanism embodying resilient and friction producing means, the former operating to maintain the latter constantly in engagement so that wear will be automatically taken up, the length of life of the entire structure being consequently increased.

An additional object of the invention is the provision of a cushioning or absorption mechanism of this type which will be comparatively simple and inexpensive to manufacture, easy to install, positive in action, efficient and durable in service, and a general improvement in the art.

Figure 2:
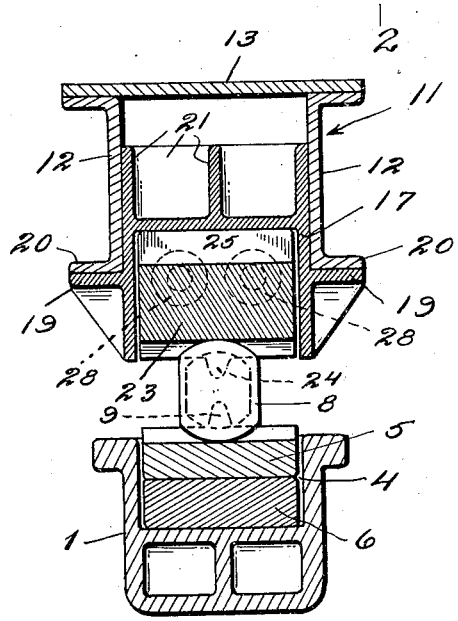

With the above and other objects and advantages in view, the invention consists in the details of construction and arrangement of parts to be hereinafter more fully described and claimed, and illustrated in the accompanying drawing in which:

Figure 1 is a vertical longitudinal section through a body bolster and truck bolster showing the invention applied, the type of truck being that in which the load is sustained upon the side bearings, and Figure 2 is a vertical cross sectional view taken on the line 2—2 of Figure 1.

Referring more particularly to the drawing, the numeral 1 designates a truck bolster having the usual center bearing 2 and end extensions 3 adapted to be mounted within the window openings in side frames and to be supported upon helical or other springs. The side frames and springs are not illustrated as they constitute no part of the present invention and their presence is not necessary to an understanding of the structure. Near its end portions the truck bolster is formed to provide pockets 4, only one of which is shown, and located within the pockets are bearing members 5 mounted upon adjusting block members 6 here disclosed as having convex curving bottom surfaces 7 conformingly engaging upon correspondingly curved surfaces at the bottoms of the pockets. Mounted upon each bearing member 5 is a roller 8 which may be conical as disclosed and which is prevented from longitudinal displacement with respect to the bearing member 5 by means of upstanding projections 9 at the ends of the latter. Thrust means 10 may also be provided at the outer end of each roller for the purpose of taking up the outward end thrust which is bound to occur in service.

The numeral 11 designates the body bolster which may include the usual channel sides 12 connected by a top plate 13 and bottom plate 14 which are of course secured to the center sills 15 of the car underframe, the bolster being provided centrally of its underside with a bearing plate 16 located within but spaced from the center bearing 2 so as to permit up and down movement of the body bolster with respect to the truck bolster while preventing relative longitudinal movement of the two, it being of course apparent that the usual swivelling action may occur.

The truck illustrated and above described is of that type in which the load is sustained by the side bearings and it should be distinctly understood that there is no limitation as to the employment of the invention in connection therewith as it is quite obvious that the truck bolster might be provided with an ordinary side bearing and that the body bolster may have its center plate fitting within and supported upon the center bearing of the truck bolster, there being, in such types of structures, a slight clearance between the ordinary side bearings and the bearing elements which depend from the body bolster for coaction therewith.

In carrying out the invention I provide a housing 17 mounted upon the body bolster 11 near each end thereof, the bottom plate of the latter being constructed of sections spaced apart or being otherwise formed to provide openings 18 which accommodate the housings. The housing is here disclosed as having outwardly extending flanges 19 or the like riveted or otherwise suitably secured to the bottom plate 14 and to the outwardly extending flanges 20 at the lower edges of the channel sides 12. Each housing 17 is preferably substantially rectangular in general contour and is also elongated in shape, the lateral dimension being such that is preferably fits closely between the channel sides 12. It is also preferred that the housing be provided with upstanding intersecting ribs 21 at its central portion for reinforcing or stiffening purposes. Clearly, there may be many variations in these details within the scope of the invention.

Extending through an opening 22 in the bottom of each housing 17 is a wedge member 23 capable of vertical movement, these wedge members engaging upon the rollers 8 which constitute the side bearings. The wedge members are also shown as having projections 24 located beyond the opposite ends of each of the rollers for the purpose of preventing longitudinal displacement thereof.

Located within each housing 17 are followers 25 having inclined surfaces 26 coacting with inclined surfaces 27 at the opposite sides of the wedge member 23 so that upon vertical movement of the wedge member the follower blocks 25 will move toward or away from each other in a horizontal direction, outward or separating movement being opposed by cushioning means such as helical springs 28 which have their outer ends bearing against the outer ends of the housing and their inner ends fitting within pockets or recesses 29 in the followers.

When the invention is embodied in a truck of the type disclosed it is intended that the clearance between the center plate 16 and center bearing 2 be greater than the vertical movement of the wedge members 23 so that the load will always be sustained by the side bearings instead of either coming upon the center bearing except, of course, in the event of failure of the springs 28 as for instance in the case of breakage thereof. In case the invention is applied to trucks of that type in which the load is sustained by the center bearing there would not be any clearance between the side bearing rollers and the wedge members 23 in view of the fact that the springs 28 would force the followers 25 toward each other resulting in downward movement of the wedge members 23 until they engage the rollers. If the invention is embodied in either type of truck it is of course clear that the springs 28 will be under a certain degree of compression though naturally in the first mentioned type the springs will be under a much greater degree of compression inasmuch as the entire load is sustained by the center bearings. Whenever there is any tendency toward relative rocking movement of the truck and body bolsters downward movement of either end of the body bolster with respect to the truck bolster will cause a relative upward movement of the wedge member 23 at that end and the inclined surfaces 27 of the wedge member acting against the inclined surfaces 26 of the followers 25 will force the followers apart against the resistance of the springs 28 which are consequently additionally compressed. It is not only these springs which resist the movement for the reason that there is a considerable degree of friction developed between the surfaces 26 and 27 and between the areas of contact of the blocks 25 with the undersurface of the top portion of the housing 17, the friction opposing movement to as great or possibly a greater extent than the springs.

Regardless of which type of truck is equipped with the invention, it is clear that the springs 28 being in series with whatever springs are provided for supporting the truck bolster within the side bearings will change the period of oscillation of the bolster supporting springs and it is therefore obvious that any tendency of the car to develop roll or side sway will be at least checked if not entirely eliminated. The initial compression of the springs 28 is of course accomplished simply by the car weight and this compression is utilized for cross equalization when necessary. Obviously, the provision of the resilient or cushioning means together with the friction producing means will avoid the bringing of excessive strains upon the side bearings and in fact any and all parts of the truck, and also the rails. Stability is greatly increased and "jiggling" prevented. It is really believed that the construction, operation and advantages will be readily apparent to one skilled in the art without further explanation.

While I have shown and described the preferred embodiment of the invention and various details of construction it should be distinctly understood that the disclosure is merely an exemplification of the principles involved as it is apparent that many changes might be resorted to to increase the adaptability and widen the field of utility of the device, and the right is reserved to make all such modifications and variations provided they constitute no departure from the spirit of the invention or the scope of the claims hereunto appended.

Having thus described the invention, I claim:

1. In combination with a car truck bolster carrying side bearings, a body bolster, and combined spring and friction producing mechanism carried by the body bolster and cooperating with the side bearings for constantly sustaining the load and additionally absorbing shocks upon relative rocking movement of the bolsters.

2. In combination with a car truck bolster carrying side bearings, a body bolster, and shock absorption mechanism carried by the body bolster and movable therewith and cooperating with the side bearings, the absorption mechanism including resilient means always sustaining the load and friction producing means opposing relative rocking movement of the truck and body bolsters.

3. In combination with a car truck bolster carrying side bearings, a body bolster, and load supporting and shock absorption mechanism carried by the body bolster and cooperating with the side bearings, including resilient means, followers engaging the resilient means and wedge means constantly engaging the side bearings and the followers for moving the latter.

4. In combination with a truck bolster carrying side bearings, a body bolster, and load sustaining shock absorption mechanism mounted in the body bolster for cooperation with each of said side bearings, each absorption mechanism including followers, wedge means engaging a side bearing and the followers, and springs engaging the followers.

5. The combination with a truck bolster having side bearings, of a body bolster, and a constantly energized load sustaining and shock absorption mechanism mounted within each end portion of the body bolster for cooperation with the side bearings, each absorption mechanism including an upstanding wedge member engaging upon the adjacent side bearing, a housing into which the wedge member projects, laterally movable followers within the housing, and springs within the housing engaging the followers for holding the latter in operative relation to and in contact with the wedge member.

6. The combination of a truck bolster having side bearings, a body bolster, and shock and pressure absorption mechanism within each end of the body bolster for cooperation with the adjacent or corresponding side bearing, each absorption mechanism including a housing secured to the body bolster and having an opening in its bottom, a vertically movable wedge member extending through said opening and engaged upon the adjacent side bearings, oppositely movable followers within the housing engaging opposite sides of the wedge member, and springs within the housing opposing separating movement of the followers.

7. In combination, a truck bolster, side bearings thereon, a body bolster having openings in its underside, housing members mounted on the body bolster at said openings and projecting partly thereinto, a vertically movable wedge member within each housing engaging upon the adjacent side bearing, and friction means opposing movement of the wedge members.

8. In combination, a truck bolster, side bearings thereon, a body bolster, housings fixed to the body bolster and partly enclosed therein, wedge members slidably mounted for vertical movement within said housings and engaging upon the side bearings, and laterally movable spring pressed followers within the housings cooperating with the respective wedge members for frictionally and resiliently opposing movement thereof.

9. In combination, a truck bolster, side bearings thereon, a body bolster, housings carried by the body bolster, vertically movable wedge members engaging the side bearings and projecting into the housings, follower blocks located at opposite sides of each wedge member and having inclined faces bearing thereagainst, and coil springs located between the ends of each housing and the adjacent ends of the followers.

10. In combination, a truck bolster, side bearings thereon, a body bolster, guide and enclosing means carried by each end of the body bolster, a wedge member slidably mounted through the bottom of each guide and enclosing member and projecting thereinto, the opposite sides of each wedge member being oppositely inclined, a pair of followers located within each guide and enclosing member and located at opposite sides of the wedge member therein and having inclined sides for cooperation with the inclined sides of the wedge member, and springs located between the outer ends of the followers and the adjacent ends of the guide and enclosing member.

11. In combination, a truck bolster, side bearings thereon including tapered rollers, a body bolster, housing members mounted at the ends of the body bolster, a vertically movable wedge member within each housing having an inclined underside engaging upon the adjacent side bearing roller, and friction means opposing movement of the wedge members, the travel of the vertical wedge being in series with the travel of springs supporting the truck bolster.

12. In combination, a truck bolster equipped at each end with a side bearing roller, a body bolster provided near each end with an opening, a housing secured to the body bolster and projecting partly into said opening, a bearing member vertically movable through the central bottom portion of the housing and engaging upon the side bearing roller, said bearing member being formed as a wedge, and spring-pressed wedges, located within the housing in cooperation with said first named wedge and movable longitudinally of the body bolster.

13. In combination, a truck bolster equipped at each end with a side bearing roller, a body bolster provided near each end with an opening, a housing secured to the body bolster and projecting partly into said opening, a bearing member vertically movable through the central bottom portion of the housing and engaging upon the side bearing roller, said bearing member being formed as a wedge, and spring-pressed wedges located within the housing in cooperation with said first named wedge and movable longitudinally of the body bolster, said housing being formed at its center with a plurality of upstanding longitudinal and transverse intersecting webs providing a reinforcing truss.

In testimony whereof I affix my signature.

THOMAS H. SYMINGTON.